United States Patent [19]
Kellison

[11] Patent Number: 4,869,467
[45] Date of Patent: Sep. 26, 1989

[54] INTERNALLY SUPPORTED RETAINING ELEMENT AND METHOD OF USING

[76] Inventor: Roger C. Kellison, 8200 Boulevard E., North Bergen, N.J. 07047

[21] Appl. No.: 139,650

[22] Filed: Dec. 30, 1987

[51] Int. Cl.$^4$ .......................................... E04H 17/14
[52] U.S. Cl. ...................................... 256/64; 256/59; 52/298
[58] Field of Search ................. 52/298, 295; 256/23, 256/59, 64

[56] References Cited

U.S. PATENT DOCUMENTS

| | | | |
|---|---|---|---|
| 1,445,938 | 2/1923 | Farrington | 52/295 |
| 1,668,486 | 5/1928 | Betts | 52/298 |
| 2,815,937 | 12/1957 | Curtze et al. | 256/23 |
| 4,614,070 | 9/1986 | Idland | 52/295 X |

FOREIGN PATENT DOCUMENTS 6554 of 1894 United Kingdom .................. 52/298

Primary Examiner—Andrew V. Kundrat
Attorney, Agent, or Firm—Brumbaugh, Graves, Donohue & Raymond

[57] ABSTRACT

A retaining element, for retaining personnel, vehicles, or the like, includes a series of lower recesses opening downward to a supporting undersurface. A collar conforming in shape to the recess is located in each recess. An anchor bolt extends through the collar and protrudes downward from each recess, and set screws retaining the collar. In use, holes are formed along a line on the supporting undersurface at locations corresponding to the protruding anchor bolts, the holes are fitted with a hardening securing agent and the retaining element is moved into place with the anchor bolts extending into the hardening securing agent.

3 Claims, 2 Drawing Sheets

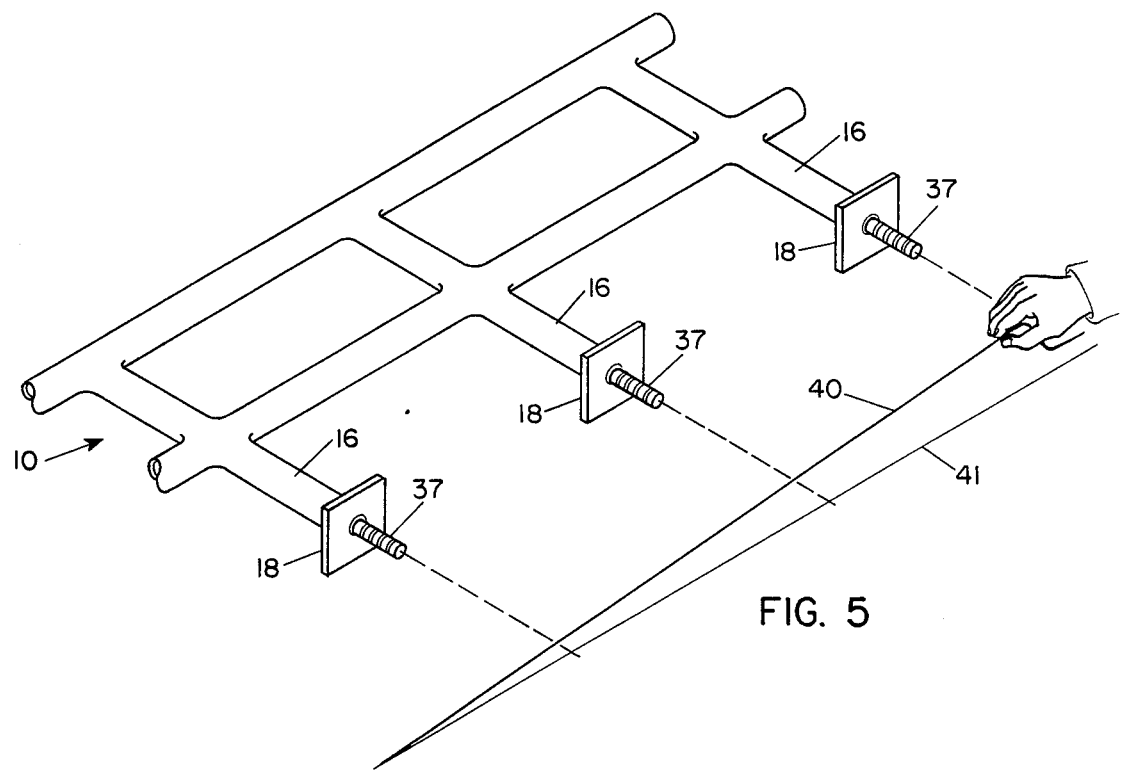
FIG. 5
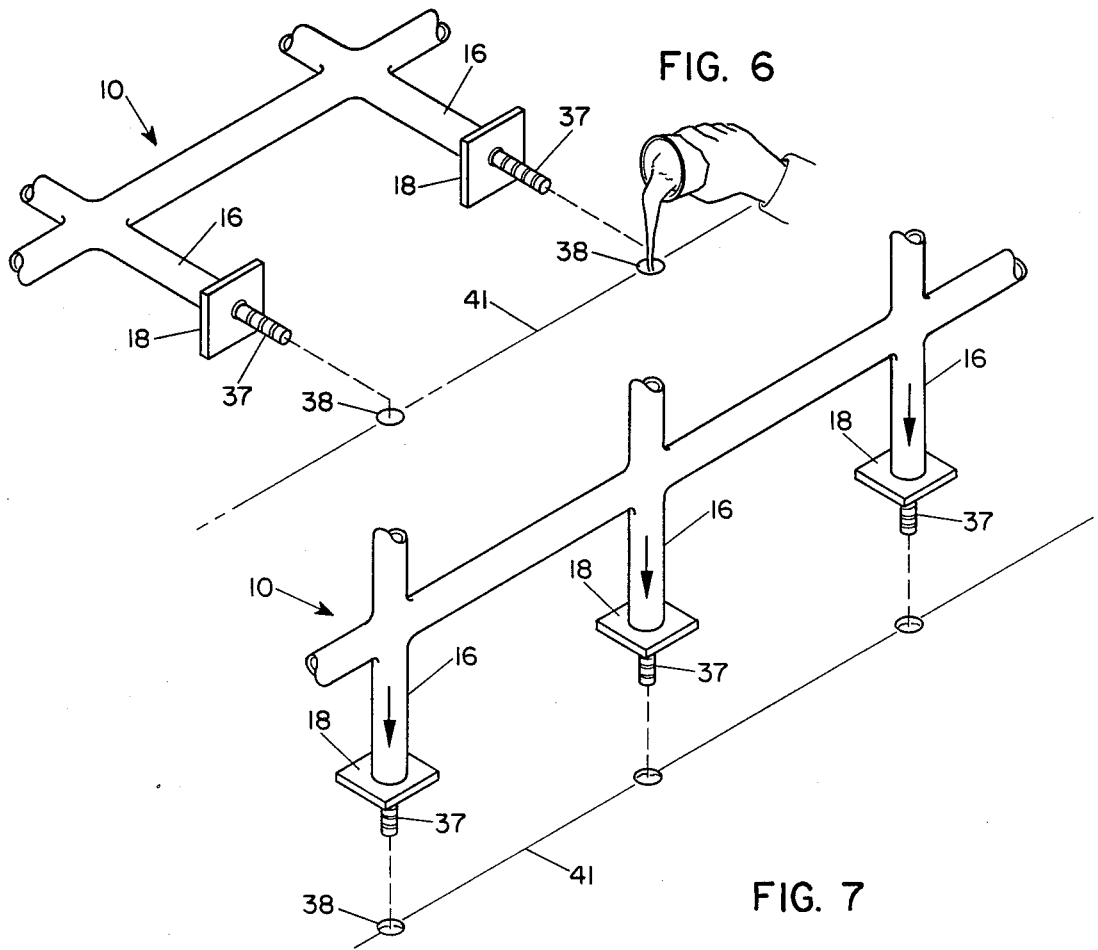
FIG. 6
FIG. 7

1

INTERNALLY SUPPORTED RETAINING ELEMENT AND METHOD OF USING

BACKGROUND OF THE INVENTION

The invention relates to retaining elements such as barriers, railings, fences, or the like, and in particular, retaining elements having fasteners including threaded members extending into holes in a supporting undersurface.

In the past, elements such as handrails of the kind having one or more horizontal rails supported by regularly spaced uprights, were often made of pipe-like tubes, held in place by plates welded perpendicular to the lowermost end of the uprights. The plates were anchored using fastening means such as through-bolts, bolts and anchors, or the like. These retaining elements and their fastening means are expensive and are, in addition, difficult and time-consuming to install. Furthermore, these retaining elements, useful to serve a temporary function such as crowd control, are not easily or inexpensively removed and relocated elsewhere.

In addition, the multiple anchoring means used in the past in proximity to one another, such as the two or more bolts placed through each welded plate, tend to concentrate load in the underlying supporting structure by causing overlapping shear cones therein, which increases the probability of cracking.

The heavy bolts and anchors often used for handrails or other barriers intended only to retain personnel, i.e., as on railroad trestles for example, were often unnecessary in view of the relative light loading anticipated.

It is an object of the present invention to overcome the above-described shortcomings of the known retaining elements, while providing several unique improvements which result in reduced costs, ease and flexibility of installation, and ease of removal and relocation.

SUMMARY OF THE INVENTION

In accordance with the present invention, a novel fastening construction and method are provided for a retaining element having an upper horizontally extending portion and a lower supporting portion, in which a fastener is secured in a recess in the lower supporting portion, and protrudes therefrom to be secured in supporting structure.

Inside the recess in the lower supporting portion of the retaining element, at its lowermost end, an annular portion of a collar is secured. The collar, in addition to the annular portion residing within the recess, further comprises a plate portion located at the lowermost end of the annular portion, and perpendicular thereto. Set screws or the like can affix the upright to the collar. Through the collar's central opening a single anchor bolt extends into a hole in the supporting undersurface. A securing agent, such as grout, hardened about the bolt in the hole, can secure the bolt, and therewith the retaining element. In the case of a retaining element of tubular construction, such as a handrail, the plate portion of the annular collar is located perpendicular to the open, lower end of a tubular upright. Rather than providing a flange that bolts to the undersurface through holes accommodating a number of anchor bolts as in the past, the wide plate portion, which is firmly seated on the supporting undersurface, resists torsional strain or bending moments in the anchor bolt resulting from lateral forces applied via the retaining element and the annular collar portion to the anchor bolt.

The anchor bolt used to secure the retaining element can be of the kind having a lower portion coarsely threaded to be better retained by the bonding agent in the hole in the undersurface. The upper portion of the bolt is threaded to receive a tightening nut to be threaded thereon trapping the collar tightly against the undersurface.

The invention also contemplates the method of installing the above-described retaining element. The locations of the holes in the undersurface onto which the retaining element is to be mounted are determined by positioning the retaining element, laying it on its side for example, with anchor bolts protruding, marking the hole locations, and then drilling the supporting undersurface at each anchor bolt. A "snap line" can be used initially to lay down a straight line along which the bolts are to be located. The dimension of the hole need not be exact, but must merely be wide and deep enough to accept the protruding end of the anchor bolt and sufficient securing agent to retain it.

Once the holes are formed, the suitable securing agent, such as a commercially available resinous cement, e.g., Kelibond or Keligrout, is poured into the hole. It is at this point that the ease of installation becomes apparent, as the entire retaining element, with fastening means already attached thereon, is placed in location as the anchor bolts are guided into the surface holes. The retaining element is then braced, if necessary, in its final position perpendicular to the surface, and remains so braced until the resin adequately sets, usually within five to twenty minutes. The retaining element may now be used for employment for its above-stated purposes.

BRIEF DESCRIPTION OF THE DRAWINGS

For a better understanding of the present invention, the scope of which will be pointed out in the appended claims, reference is made to the following detailed description of an exemplary embodiment, taken in conjunction with the accompanying drawings, in which:

FIG. 5 is a fragmentary perspective view of the handrail of FIG. 1, and illustrates the manner of locating holes for the receipt of anchor bolts securing the handrail in place;

FIG. 6 is a further fragmentary perspective view illustrating the introduction of a hardening bonding agent in holes prior to introduction of anchor bolts; and FIG. 7 is a fragmentary perspective view of the handrail of FIG. 4 and the bonding agent-filled holes of FIG. 7 during the step of locating the handrail in place.

DETAILED DESCRIPTION OF THE PREFERRED EMBODIMENT

Figure 1:
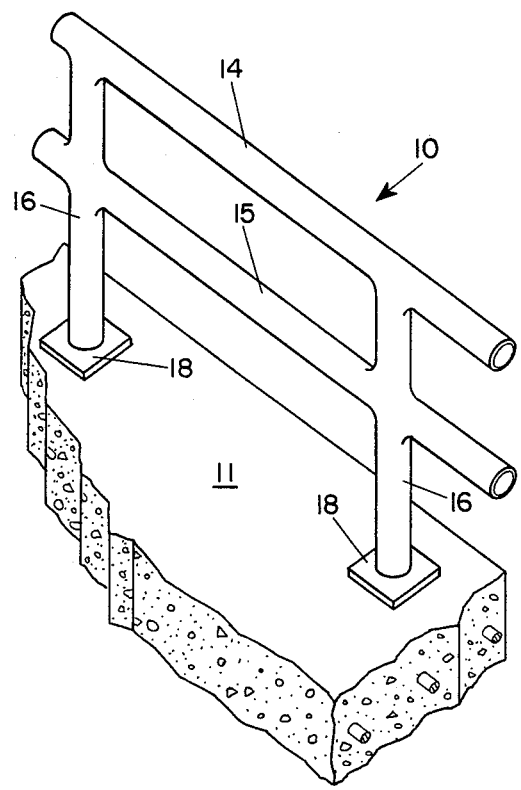
FIG. 1 is a fragmentary perspective view of a handrail incorporating the invention and shows the handrail in place on a concrete undersurface.

In FIG. 1, a handrail 10 of the kind incorporating the invention is shown secured to a prestressed concrete slab 11, such as a bridge, balcony, trestle or the like. The handrail 10 has horizontal upper and lower rails 14 and 15, respectively. Spaced along the length of the handrail uprights 16 (one of which is shown) support the horizontal rails 14 and 15 and secure the handrail to the supporting surface, i.e., slab 11.

The rails 14, 15 and upright 16 are of hollow tubular construction. In the specific, illustrative embodiment shown, they are cylindrical, but other hollow, cross-sectional shapes such as square or rectangular are equally usable.

A plate portion 18 abuts each upright 16, where the upright approaches the surface of the slab 11. As described more fully below, this plate resists rocking or tilting of the handrail resulting from lateral or torsional forces applied to the handrail.

Figure 2:
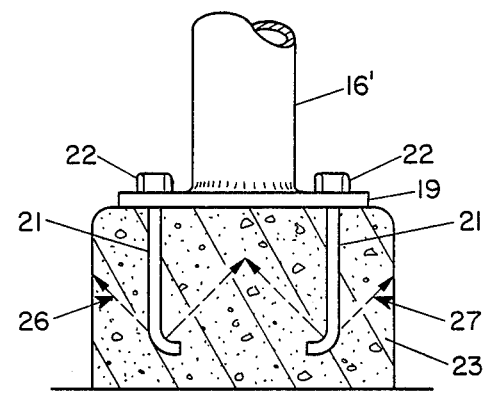
FIG. 2 is an enlarged fragmentary cross-sectional view of a handrail similar to that of FIG. 1, but connected to a supporting surface in conventional fashion.

In FIG. 2, a conventional manner of fastening such a handrail or other retaining element is shown. There, the upright 16' ends in a plate 19 welded thereto. This plate, however, has openings through which extend threaded ends of cast-in-place shafts 21. Nuts 22 clamp the plate to the supporting undersurface member 23 fixing the handrail in place. As many as four anchoring shafts and mating nuts are used per upright. Shear cones 26 and 27, indicated by the diagonal lines in FIG. 2, are established in the support structure 23, and overlap to increase susceptibility to failure where the overlapping occurs. Inadequate distance from the shafts 21 to the side edges of the support structure 23 may occur, as shown.

Figure 3:
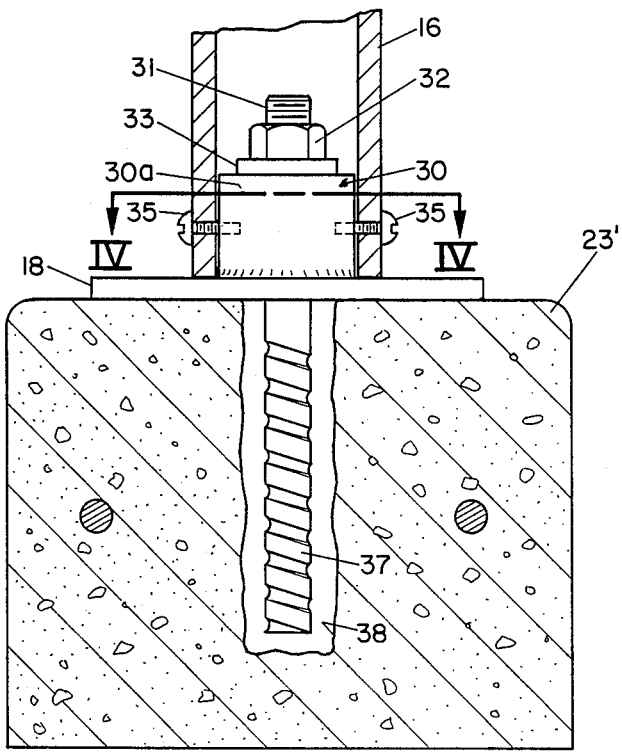
FIG. 3 is an enlarged fragmentary cross-sectional view of the handrail of FIG. 1, showing the features fastening the handrail to the supporting surface.
Figure 4:
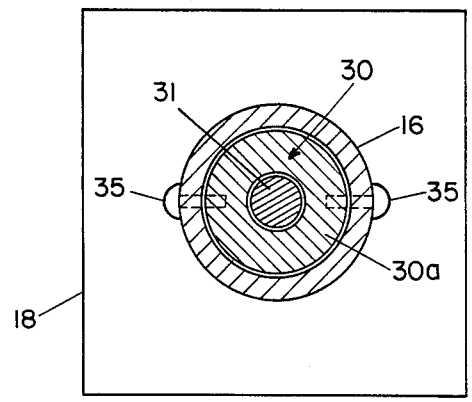
FIG. 4 is a cross-sectional view along the lines IV—IV of FIG. 3, showing the fastening features of the handrail.

In FIGS. 3 and 4, the elements of the connecting provisions of the retaining element 10 are shown. These include a collar 30 with internal annular portion 30a and the plate portion 18 affixed thereto, an anchor bolt 31, a nut 32 threaded onto the anchor bolt 31, a washer 33, and set screws 35. The plate portion 18 can be welded to or integrally formed with the internal part of the collar. The anchor bolt 31 has an end 37 received in a hole 38. That end of the bolt may be roughened, for example by coarse, soft threads to promote good gripping by a grout or bonding agent filling the hole. Commercially available bolts of the kind depicted are available from the Kelken-Gold Company under the trademarks Lefty and Kelibond Bolts.

The collar 30 is received in the hollow tubular upright 16 at its lower end, holding the retaining element in place. The pair of set screws 35 extend through small holes in the upright and thread into openings provided in the outer surface of the collar. These prevent the retaining elements being lifted vertically off of the collars at each of the uprights. The nut 32 holds the collar 30 and the washer 33 captive between itself and the upper surface of a supporting member 23', like the member 23 of FIG. 2. By virtue of its broad area of contact with the undersurface, to which it is firmly clamped, the plate portion 18 of the collar 30 prevents rocking of the retaining element leading to fracture or fatigue of the bolt 37. Unlike the shafts 21 of FIG. 2, the bolt 37 of FIG. 3 does not create overlapping shear cones, and it is much farther spaced from the side edges of the supporting member 23' than are the shafts 21 with respect to the edges of the supporting member 23 in FIG. 2.

The method of installing a retaining element like the handrail 10 is illustrated in FIGS. 5, 6 and 7. First a "snap line" 40 locates the straight chalk line 41 along which the handrail is to be located. The handrail 10 is laid next to the chalk line with the protruding ends 37 of the anchor bolts 31 adjoining the line 41 to indicate the locations where holes are to be drilled. A series of holes 38 is drilled and filled with a suitable grout or bonding agent such as the products sold by Kelken-Gold, Inc. under the trademarks Kelibond or Keligrout. The entire unit is tilted into place with the protruding bolt ends extending into the prepared holes, and braced to be perpendicular while the grout or bonding agent sets. The handrail is easily removed by loosening the set screws 35, lifting away the handrail removing the nut, washer and collar, and then removing the bolt by cutting off the end with a torch or by unscrewing the bolt in the case of a removable bolt like the aforementioned Lefty bolt.

While a specific preferred embodiment of the invention has been illustrated and described, it will be appreciated that numerous variations in the exemplary embodiment can be made without departure from the spirit and scope of the invention as defined in the appended claims. For example, while only a handrail has been illustrated, it will be apparent that a wide variety of retaining elements, such as highway barriers, fence, and partitions of various kinds can employ features of the invention.

I claim:

1. The method of installing a retaining element on a supporting undersurface including the steps of:
    (a) providing a retaining element with recesses formed therein at locations where the retaining element is to be connected to the supporting undersurface;
    (b) locating in the recess a collar conforming to the interior of the recess;
    (c) providing a bolt extending through the collar and protruding from the recess;
    (d) locating on the undersurface a line along which the retaining element is to extend;
    (e) identifying at least one point on the line for the location of a hole in the supporting undersurface to receive the protruding bolt;
    (f) forming a hole at the point;
    (g) filling the hole with a hardening securing agent; and
    (h) moving the retaining element into place with the bolt in the hole; whereby upon hardening of the securing agent the retaining element is securely affixed in place in correct location along the line on the undersurface.

2. The method of installing a retaining element, according to claim 1, wherein the step of locating a line comprises marking a line along the supporting undersurface, and the step of identifying at least one point comprises, locating a plurality of points along the line by placing the retaining element by the line with bolts protruding at the plurality of points, and forming a hole in the supporting undersurface at each of the points so-located.

3. The method of installing a retaining element according to claim 2, wherein the retaining element is of tubular construction, and the recesses are provided by the interior of the bottom of tubular uprights, the step of moving the retaining element into place comprises locating the bolts extending from the recesses at the bottom of the tubular uprights in the holes formed at each of the points, and temporarily supporting the retaining element upright as hardening securing agent in each of the holes hardens to secure the retaining element in the desired position thereof.

* * * * *